March 3, 1964  D. V. LOUZOS ETAL  3,123,749
ELECTRODE ASSEMBLY FOR ELECTROCHEMICAL LINEAR DETECTOR UNITS
Filed Aug. 26, 1960  2 Sheets-Sheet 1
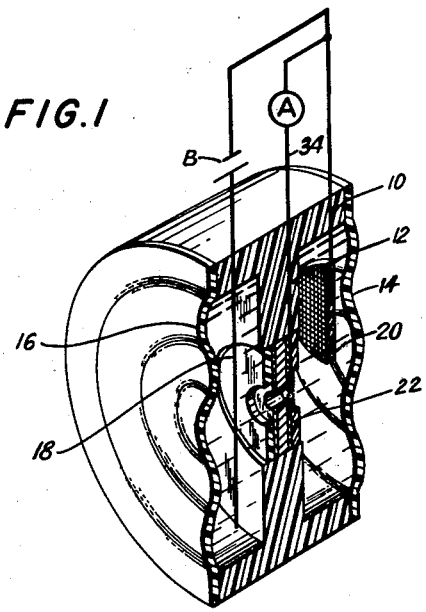
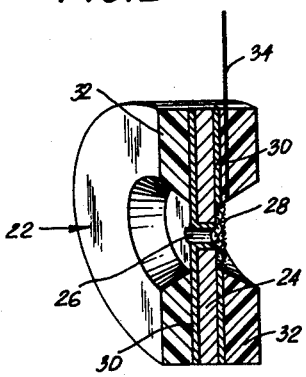
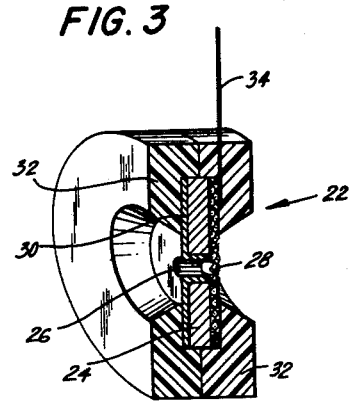
INVENTORS
DEMETRIOS V. LOUZOS
ROBERT A. MINNERY
TERRENCE J. KURTZWEIL
BY *John F. Hohmann*
ATTORNEY

United States Patent Office

3,123,749
Patented Mar. 3, 1964

3,123,749
ELECTRODE ASSEMBLY FOR ELECTRO-
CHEMICAL LINEAR DETECTOR UNITS
Demetrios V. Louzos, Rocky River, Robert A. Minnery, Cleveland, and Terrence J. Kurtzweil, Avon, Ohio, assignors to Union Carbide Corporation, a corporation of New York
Filed Aug. 26, 1960, Ser. No. 52,248
10 Claims. (Cl. 317—231)

This invention relates to electrochemical linear detector units, and more particularly it relates to an improved electrode assembly for such units.

One member of a recently introduced family of electrochemical devices generally referred to as "solions" is a linear detector. The basic principles of solion devices are described in a paper by Hurd and Lane "Principles of Very Low Power Electrochemical Control Devices," "Journal of the Electrochemical Society," volume 104, #12, December 1957. Linear detectors of the solion type convert signals such as acoustical pressure into electric current. They comprise generally a housing divided into two compartments, one wall of which compartment is a flexible diaphragm. The other wall is a common partition having an aperture in which is mounted a detecting electrode assembly having a tiny orifice for the transmission of liquid from one compartment to the other. The detecting electrode is usually a cathode, but may be an anode. For conciseness, it will be referred to herein specifically as a "cathode." Both compartments of the devices are filled with a liquid electrolyte containing a reversible redox system, and in each compartment is an electrode, one of which is made the anode in a biasing circuit and the other a separator electrode. When properly biased, a measured species of the redox system becomes concentrated in the anode compartment and becomes dilute in the separator compartment. Now, if a signal such as an acoustical pressure is provided on the flexible diaphragm defining the wall of the anode compartment, the solution in that compartment tends to flow through the orifice and the measured species of the redox system is reduced at the detecting cathode, whereby an electrical current is caused to flow through the biasing circuit which can be measured. The current observed at a fixed voltage increases with the applied pressure and is a linear function of the pressure input. Hence, the device is referred to as a "linear detector."

In electrochemical solion detectors of this type, the detecting cathode assembly has usually been composed of a plastic barrier or disc having a conical hole therein so arranged as to terminate in a tiny orifice on one side of the barrier. Several conically shaped platinum screens were disposed within this conical hole and were held in place by a plastic plug, the platinum screens providing the active cathode surface. Until now, this detecting cathode assembly has sufficed for use in a linear detector, but it has been plagued by many difficulties and has fallen short of the rather strict requirements placed upon the cathode. For example, it has been difficult to place the platinum screens in proper relation to the orifice without crushing them and without the occurrence of voids between the several layers of screen. It has also been difficult to maintain the screens the proper distance from the exterior of the orifice so that the linear detector will possess the necessary time constants for its proper operation, and to keep the platinum screens from protruding through the orifice especially when the linear detector was subjected to severe conditions, for example, of both thermal and mechanical shock. The attainment of these requirements of the detecting cathode assembly is essential to the sensitivity of a linear detector, and, consequently, because they have been achieved only with difficulty and because often they have not been satisfactorily met, there is an ever-present demand for an improved detecting cathode assembly.

It is therefore an important object of the invention to provide an improved detecting electrode assembly for a solion linear detector unit.

It is a more specific object to provide such an improved detecting electrode assembly which is capable of more accurate and simple manufacture and more uniform performance.

The invention by means of which these objects are achieved comprises a layer-built electrode assembly for a solion linear detector unit. The electrode assembly of the invention comprises at least one of a metal sheet having an orifice therein and a layer of platinum screen in juxtaposition to one side of the metal sheet and overlying the orifice in fixed relation thereto. The metal sheet is composed of a metal which is highly inert to the electrolyte solution of the device and specifically is composed of a metal selected from the group consisting of tantalum, niobium and zirconium. The exposed surfaces of the metal sheet are insulated by a layer of an oxide of the metal of which the sheet is composed. The electrode is mounted within a body or frame which is composed of an insulating material. Suitably, the electrode assembly may be mounted, for instance, between a pair of plastic washers between which it is sealed.

The invention will be disclosed more fully with reference to the accompanying drawings, in which:

FIG. 1 is an isometric view, part being broken away, of a linear detector unit provided with a detecting cathode assembly embodying the invention;

FIG. 2 is a similar view of the detecting cathode assembly provided in the device of FIG. 1;

FIG. 3 is a similar view showing another embodiment of the invention;

Figure 4:
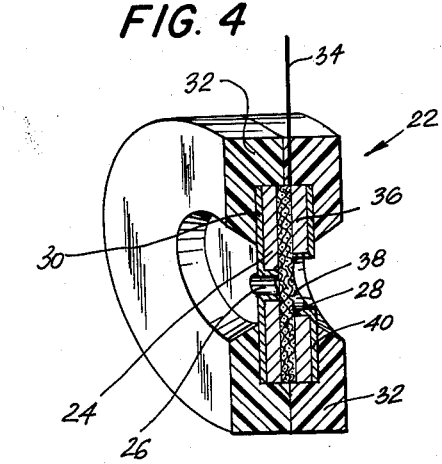
FIG. 4 is a similar view showing still another embodiment.

Referring to the drawings, there is shown in FIG. 1 a solion linear detector unit provided with a detecting cathode assembly embodying the invention. The linear detector unit comprises a housing 10 which is divided into two compartments by an apertured partition 12, each of the compartments having as one wall thereof one of a pair of flexible diaphragms 14, 16. In one compartment is an electrode 18 which is connected to a biasing circuit which includes a biasing battery B. The other compartment has an electrode 20 composed of a platinum screen which is a separator electrode. The electrode 18 is biased positive in respect to the separator electrode 20 and is made the anode of the device. A detecting cathode assembly, indicated generally at 22, is positioned in the aperture of the partition 12 and is connected to the biasing circuit through an ammeter A in parallel with the separator electrode 20. The detecting cathode assembly, as best seen in FIG. 2, is composed of a metal disc 24 which has an orifice 26. The metal disc 24 is made of a metal selected from the group consisting of tantalum, niobium and zirconium. One or more layers of a platinum screen 28 are provided in juxtaposition to one side of the metal disc 24 and overlie the orifice 26. The layers of platinum screen 28 are affixed directly to the metal sheet 24 as by welding them to it and are held tightly and firmly against the orifice 26 in fixed relation thereto. The exposed surfaces of the metal disc 24, including those in the orifice 26, are insulated by a layer of an oxide 30 of the metal of which the disc 24 is composed. A pair of insulating washers 32, between which the edges of the metal disc 24 are sealed, support the detecting cathode assembly within the apertured partition 12 of the device. A lead 34 is welded or otherwise secured to the layers of platinum screen 28 and, as indicated in FIG. 1, connects the detecting cathode to the biasing circuit. Both compartments of the device are filled with an electrolyte composed of an aqueous solution containing a reversible redox system, for instance, a potassium iodide-iodine redox system.

Figure 5:
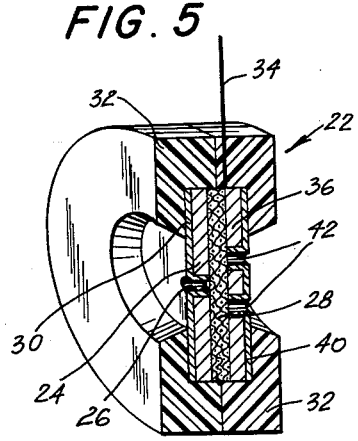
FIG. 5 is a similar view showing a further embodiment.
Figure 6:
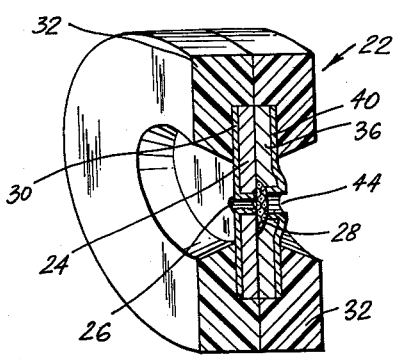
FIG. 6 is a similar view showing a still further embodiment.

As shown in FIGS. 3 to 6 inclusive, there are a number of ways in which the principles of the invention may be accomplished. For example, the detecting cathode assembly may be composed of a metal disc 24 and one or more layers of platinum screen 28, the edges of which are sealed between the pair of insulating washers 32 together with those of the metal disc 24, as shown in FIG. 3. The washers 32 hold the platinum screen 28 firmly against the orifice 26 so that there is little or no opportunity for the platinum screen 28 to become displaced from the orifice 26, thereby to affect the sensitivity of the device. It will be observed that this construction eliminates the need for affixing the layers of platinum screen 28 directly to the metal disc 24 as by welding them to it, although they may also be welded to the metal disc 24 if so desired. Another construction of the detecting cathode assembly which may be used is shown in FIG. 4. Here, the detecting cathode assembly comprises an additional metal disc 36 having a large aperture 38 at its center, which disc 36 is provided in juxtaposition to the layers of platinum screen 28 on the side of the electrode assembly opposite the orifice disc 24. This additional metal disc 36 similarly is composed of a metal selected from the group consisting of tantalum, niobium and zirconium, and has on its exposed surfaces a layer of an oxide 40 of the metal of which the metal disc 36 is composed. Both metal discs 24, 36 and the platinum screen 28 disposed between them are sealed at their edges between the pair of insulating washers 32, similarly as shown in FIG. 3, and the platinum screen 28 may also be welded to the metal disc 36 if it should be desired. The addition of the metal disc 36 further insures rigidity of the electrode assembly and serves to hold the platinum screen 28 more firmly in place against the orifice 26. The detecting cathode assembly may be further modified, for instance, by replacing the large aperture 38 in the metal disc 36 with two or more smaller apertures 42 positioned at spaced intervals in the center of the disc 36, as shown in FIG. 5. This modification of the detecting cathode assembly provides for a baffling effect which may be desirable, for example, when it is necessary to control the flow of fluid which passes through the orifice 26. FIG. 6 shows a further embodiment of the invention which permits the use of smaller size platinum screens 28 and which further provides added rigidity to the detecting cathode assembly. In this instance, the additional metal disc 36 has a cupped shaped, apertured center 44 which fits over the layers of platinum screen 28 and holds them firmly against the orifice 26 in the metal disc 24. The platinum screen 28 is cut to fit the orifice 26. The sides of each of the metal discs 24, 36 lie flush against one another and may be welded together. It will be noted that the detecting cathode assembly shown in each of the embodiments of FIGS. 3 to 6, inclusive, is otherwise identical to the construction of the detecting electrode assembly previously described; for instance, the metal disc 24 is insulated by a layer of metal oxide 30 applied to its exposed surface and a lead 34 is welded or otherwise secured to the layers of platinum screen 28.

Figure 7:
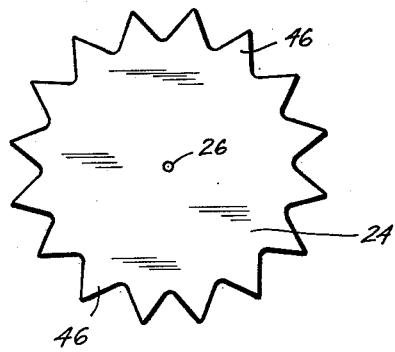
FIG. 7 is an enlarged plan view of a metal disc employed in the detecting cathode assembly embodying the invention.

The electrode assembly of the invention may be quite simply constructed. For example, the detecting electrode assembly shown in FIG. 2 may be made from a tantalum sheet having an average thickness of about 0.002 inch. The tantalum sheet may be provided, for example, in the form of a metal disc 24, as shown in FIG. 7. The outer peripheral edges of the disc are provided with a multiplicity of serrations shown, for example, at 46. These serrations are provided for the purpose of achieving a strong mechanical bond with the insulating washers between which the edges of the metal disc are sealed. The tantalum disc is approximately ¼ inch in diameter and has an orifice about 0.012 inch in diameter drilled through it at its center. To one side of the tantalum disc in the vicinity of the orifice are welded one or more layers of platinum screen or gauze, 150 x 150 mesh platinum screen being suitable, for example. The electrode thus formed is next anodized to provide the exposed surfaces of the tantalum disc with a thin layer of tantalum oxide. After the tantalum disc is anodized, the electrode is sealed at its outer edges between a pair of plastic washers having an inner and outer diameter, respectively, of about 3/16 and ½ inch. The washers should be composed of a plastic which is inert to the electrolyte solution of a linear detector. A plastic composition of poly-tri-fluoro-chloro-ethylene is a suitable material of which the washers may be made.

The electrode may be anodized to provide the exposed surfaces of the tantalum disc with a layer of tantalum oxide in the following manner: The surfaces of the tantalum disc are first cleaned with a suitable solvent, washed with an alkaline detergent and then washed again in hot water. The tantalum disc is then etched, suitably in a mixture of nitric acid and hydrofluoric acid (40% nitric acid by volume) at room temperature. After etching, the disc is again washed in hot water. The tantalum disc is then made the anode between a pair of platinum cathodes in an acid electrolyte, suitably a 0.0025 normal solution of phosphoric acid to form the tantalum oxide coating in situ. A current of about 140 to 170 milliamperes is passed, at about 20 volts, and the voltage is raised slowly to about 115 to 125 volts.

Cathodes prepared in the manner described above were utilized in solion linear detectors in a series of tests in which the device proved to yield consistently uniform and sensitive response to a pressure input signal which was varied over a wide range of conditions. In the tests, the linear detectors employed an electrolyte solution containing a potassium iodide-iodine redox system.

The electrode of the invention is mechanically stable in its construction and highly inert to the electrolyte solution of a linear detector, and it may be accurately and simply manufactured. It has been demonstrated, for instance, that the platinum screen of the detecting electrode assembly is not easily displaced from its position in relation to the orifice under a variety of conditions of both thermal and mechanical shock, thereby insuring the stability of the device in which it is used.

It will be apparent to those skilled in the art that the foregoing description is exemplary of the principles of the invention and that many variations are possible and may be made without departing from the spirit and scope of the invention.

We claim:

1. An electrode assembly for a linear detector unit, which comprises at least one of a metal sheet composed of an inert metal and having an orifice therein and a platinum screen in juxtaposition to said metal sheet and overlying said orifice in fixed relation thereto, and a layer of an oxide of the metal of which said metal sheet is composed on the exposed surfaces of said metal sheet, at least said metal sheet being mounted within a body composed of an insulating material.

2. An electrode assembly for a linear detector unit as defined by claim 1 in which said metal sheet is composed of a metal selected from the group consisting of tantalum, niobium and zirconium.

3. An electrode assembly for a linear detector unit as defined by claim 1 in which said platinum screen is secured directly to said metal sheet.

4. An electrode assembly for a linear detector unit as defined by claim 1 in which the edges of said platinum screen are mounted within said body together with said metal sheet.

5. An electrode assembly for a linear detector unit as defined by claim 1 in which said metal sheet is a disc having a multiplicity of serrations at its outer peripheral edges.

6. An electrode assembly for a linear detector unit, which comprises a metal sheet having an orifice therein, at least one platinum screen in juxtaposition to said metal sheet and overlying said orifice in fixed relation thereto, an additional metal sheet having at least one aperture therein in juxtaposition to said platinum screen, said metal sheets being composed of an inert metal, and a layer of an oxide of the metal of which said metal sheets are composed on the exposed surfaces of said metal sheets, at least said metal sheets being mounted within a body composed of an insulating material.

7. An electrode assembly for a linear detector unit as defined by claim 6 in which said metal sheets are composed of a metal selected from the group consisting of tantalum, niobium and zirconium.

8. An electrode assembly for a linear detector unit as defined by claim 6 in which said platinum screen is secured directly to said metal sheets.

9. An electrode assembly for a linear detector unit as defined by claim 6 in which the edges of said platinum screen are mounted within said body together with said metal sheets.

10. An electrode assembly for a linear detector unit as defined by claim 6 in which said platinum screen is provided in juxtaposition to said metal sheet in the vicinity of said orifice and in which said additional metal sheet has a cupped shaped apertured center which fits over said platinum screen.

References Cited in the file of this patent

UNITED STATES PATENTS

| | | |
|---|---|---|
| 1,745,175 | Lilienfeld | Jan. 28, 1930 |
| 2,685,025 | Root | July 27, 1954 |
| 2,890,414 | Snavely | June 9, 1959 |
| 2,896,095 | Reed | July 21, 1959 |
| 2,955,999 | Tirrell | Oct. 11, 1960 |